(12) United States Patent
Leger et al.

(10) Patent No.: US 8,359,788 B2
(45) Date of Patent: Jan. 29, 2013

(54) TUBING, A SYSTEM CONTAINING TUBING FOR AND METHOD FOR REMOVING SAP FROM A TREE

(75) Inventors: Alexandre Leger, Quebec (CA); Jean-Marie Chabot, Saint-Damien (CA); Rodrick Levesque, Levis (CA); Stephane Gonthier, Saint-Redempteur (CA); Gaston Lacasse, St-Henri (CA)

(73) Assignee: 9244-6699 Quebec Inc., Saint-Lazare-de-Bellechasse, Quebec (CA)

( * ) Notice: Subject to any disclaimer, the term of this patent is extended or adjusted under 35 U.S.C. 154(b) by 0 days.

(21) Appl. No.: 12/726,795

(22) Filed: Mar. 18, 2010

(65) Prior Publication Data

US 2011/0088316 A1    Apr. 21, 2011

Related U.S. Application Data

(60) Provisional application No. 61/161,341, filed on Mar. 18, 2009.

(51) Int. Cl.
 *A01G 23/10* (2006.01)
(52) U.S. Cl. .......................................... 47/52

(58) Field of Classification Search ................ 47/50–54, 47/10–12; 119/769, 792; 248/58, 61, 74.3, 248/589
See application file for complete search history.

(56) References Cited

U.S. PATENT DOCUMENTS

| 1,186,741 | A | * | 6/1916 | Brower | 285/189 |
| 2,944,369 | A | * | 7/1960 | Soule | 47/52 |
| 3,226,883 | A | * | 1/1966 | Lamb | 47/52 |
| 4,512,104 | A | * | 4/1985 | Lamb | 47/52 |
| 4,625,631 | A | * | 12/1986 | Vera | 454/172 |
| 5,224,289 | A | * | 7/1993 | Buzzell | 47/52 |
| 6,370,818 | B1 | * | 4/2002 | Chabot et al. | 47/50 |
| 6,792,894 | B1 | * | 9/2004 | Donaldson | 119/856 |

* cited by examiner

*Primary Examiner* — Rob Swiatek
*Assistant Examiner* — Ebony Evans
(74) *Attorney, Agent, or Firm* — Edwards Wildman Palmer LLP; Howard M. Gitten

(57) ABSTRACT

A system for removing sap from a plurality of trees includes a main tube supported at least in part by a plurality of drain tubes without the use of a spinal support. The main tube as supported can negotiate a path between a plurality of trees. The drain tubes are adapted to be supported at the trees. The drain tubes are in fluid communication with the main tube for removing sap through a drain tube into the main tube.

13 Claims, 9 Drawing Sheets

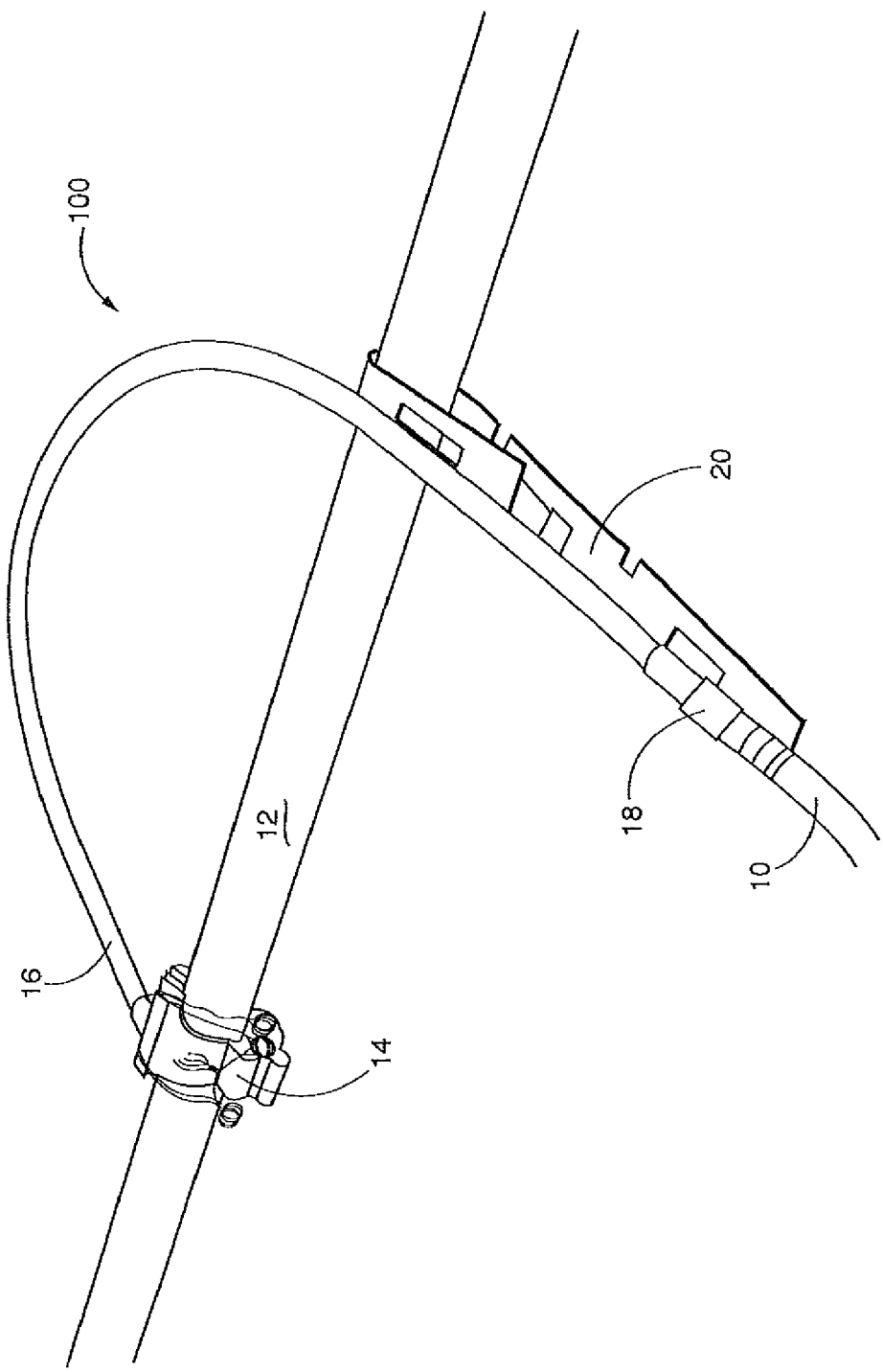

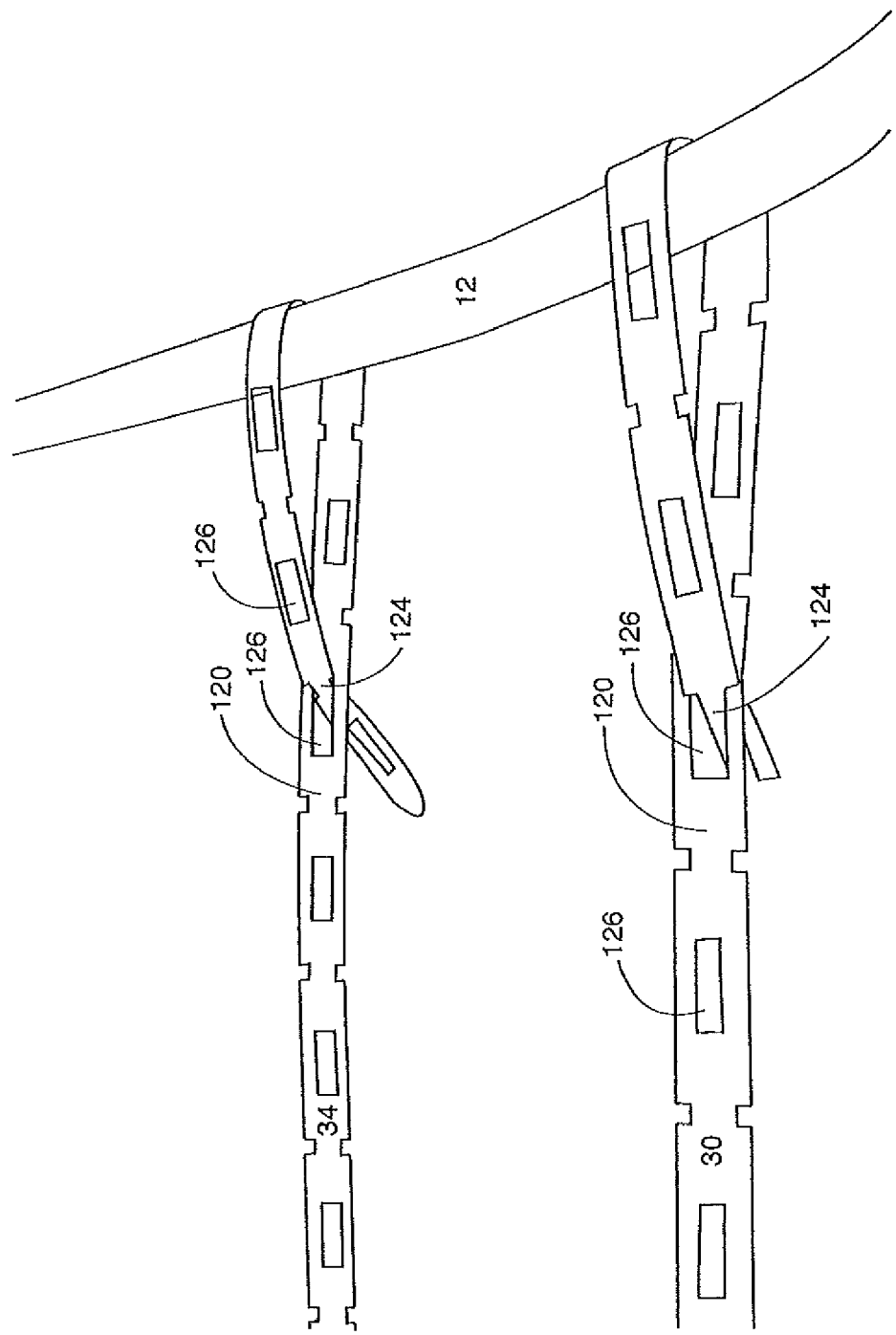

TUBING, A SYSTEM CONTAINING TUBING FOR AND METHOD FOR REMOVING SAP FROM A TREE

This application claims priority under 35 U.S.C. 119(e) to U.S. Provisional Application No. 61/161,341, filed Mar. 18, 2009, the entirety of which is hereby incorporated by reference.

BACKGROUND OF THE INVENTION

Field of the Invention

The invention is directed to a system for removing sap from a tree, and in particular, the use of a main tube with desired rigidity to convey the sap through the system.

As is known in the art, as shown in FIG. 1, a tubing system is supported amongst trees from which sap is to be removed. The tubing includes a plurality of draining tubes 506, which each extending from a respective tree (not shown) to convey sap from the tree. A main tube 504 having a diameter greater than the respective draining tubes is in fluid communication with each of the respective draining tubes. A spinal wire 502 is disposed along the length of main tube 504 and connected with anchoring wire 514 to main tube 504 to provide a spine and support along the spine parallel with a long axis of the tube (spinal support). A connector 508 connects the wire 502 to one or more of the trees and supports the main tube by suspending spine wire 502 from the trees. A second connector 510 connects spine wire 502 to drain tube 506.

The prior art system is satisfactory. However main tube 504 is sufficiently rigid so that when it stretches during use, it exhibits plastic deformation. Therefore, as main tube 504 shifts during use, it exhibits a new shape. Because of plastic deformation, the new shape is retained by main tube 504, and main tube 504 will crack if movement is required again. This requires manually replacing sections of tube as they crack.

In order to overcome the shortcoming, wire spine 502 is used to hold main tube 504 in place; preventing plastic deformation by preventing shifting in the first instance. However, this adds cost in both a.) time to set up the system and b.) material; the additional wire. Furthermore, each summer, the entire system must be removed in order to allow for machinery and personnel to maintain the tree farm between sap drainings. The additional wire adds time to the process and the plastic deformed tube lends itself to breakage during removal. Furthermore, once the main tube has changed shape, even if it doesn't break, it is very difficult to return the main tube to the exact configuration from which it was removed; making reuse of the main tube from year to year or season to season impracticable.

Accordingly a system which overcomes the shortcomings of the prior art is desired.

BRIEF SUMMARY OF THE INVENTION

A system for removing sap from a plurality of trees includes a main tube supported by a plurality of drain tubes without the need for spinal support (along the length of the main tube). The main tube as supported, can negotiate a path between a plurality of trees. The drain tubes are adapted to be supported at the trees. The drain tubes are in fluid communication with the main tube for removing sap through a drain tube into the main tube.

In a preferred embodiment, the main tube is made from a polyolefin, polyethylene, elastomer PVC, PVC, polyurethane elastomer, or polyolefin elastomer with an ultraviolet protector, and exhibits an elasticity between 1% and 6% at substantially 30 to 60 kilograms of force per square centimeter.

In one embodiment, supplemental support is provided to anchor the main tube to a respective tree. The supplemental support may be provided by a plastic strap.

BRIEF DESCRIPTION OF THE DRAWINGS

For a fuller understanding of the invention, reference is made to the following description taken in connection with the following drawings in which:

FIG. 8 is a perspective view of a system for removing sap from a tree constructed in accordance with another embodiment of the invention; and FIG. 9 is a perspective view of a system for removing sap from a tree constructed in accordance with the another embodiment of the invention.

DETAILED DESCRIPTION OF THE INVENTION

Figure 1:
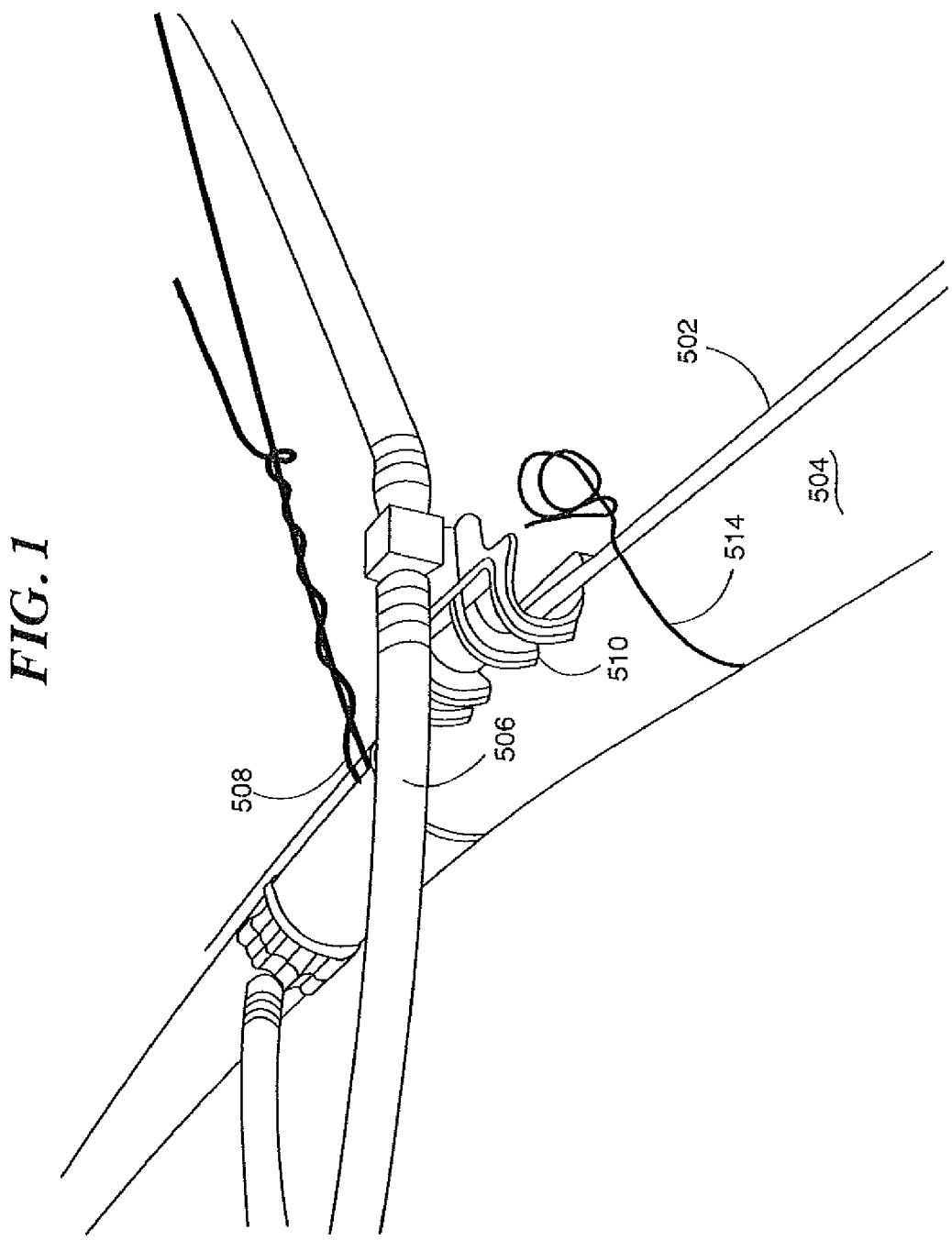
FIG. 1 is a perspective view of a prior art system for removing sap from two or more trees.
Figure 2:
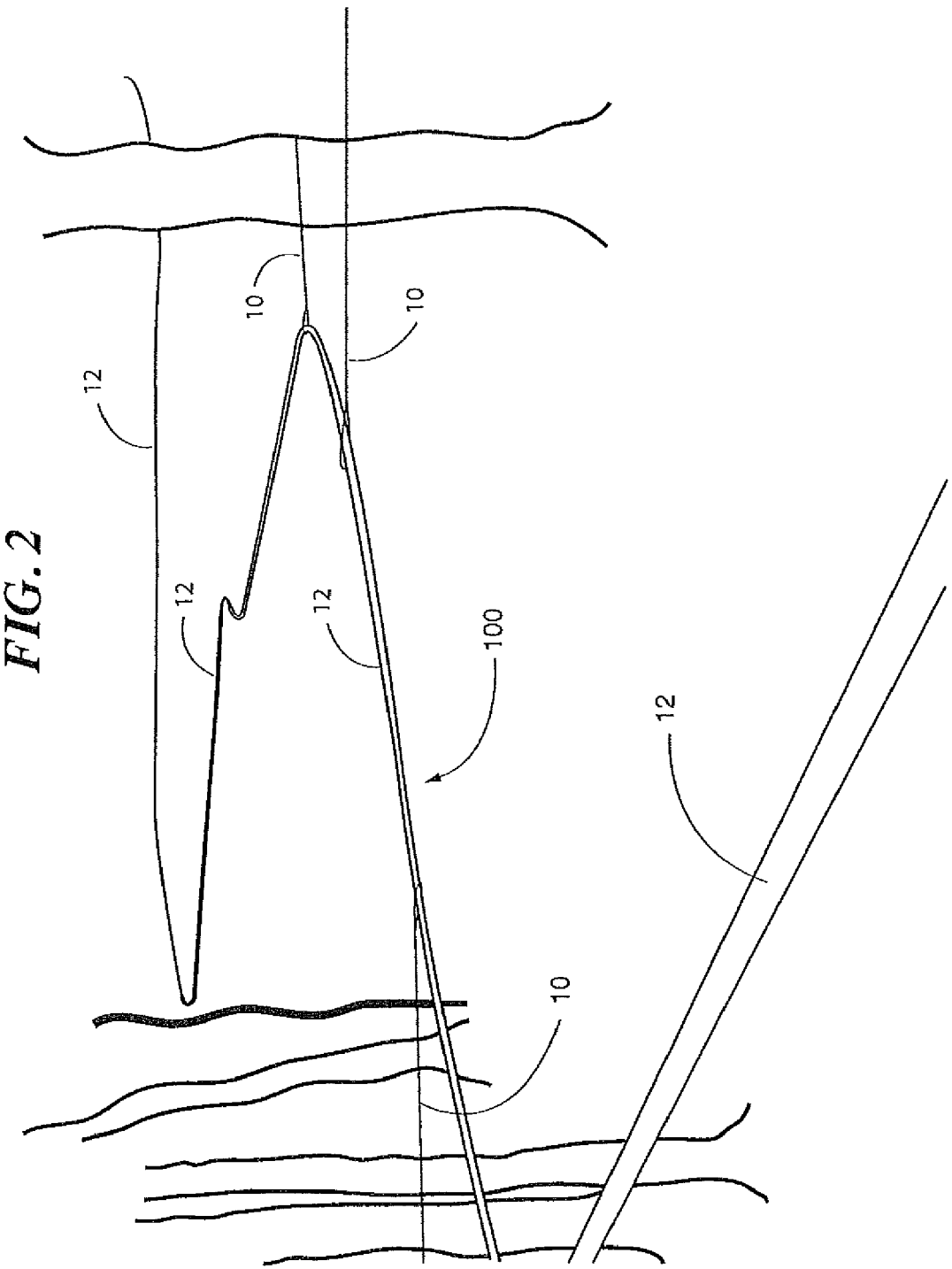
FIG. 2 is a perspective schematic view of a system for removing sap from a tree constructed in accordance with the invention.
Figure 3:
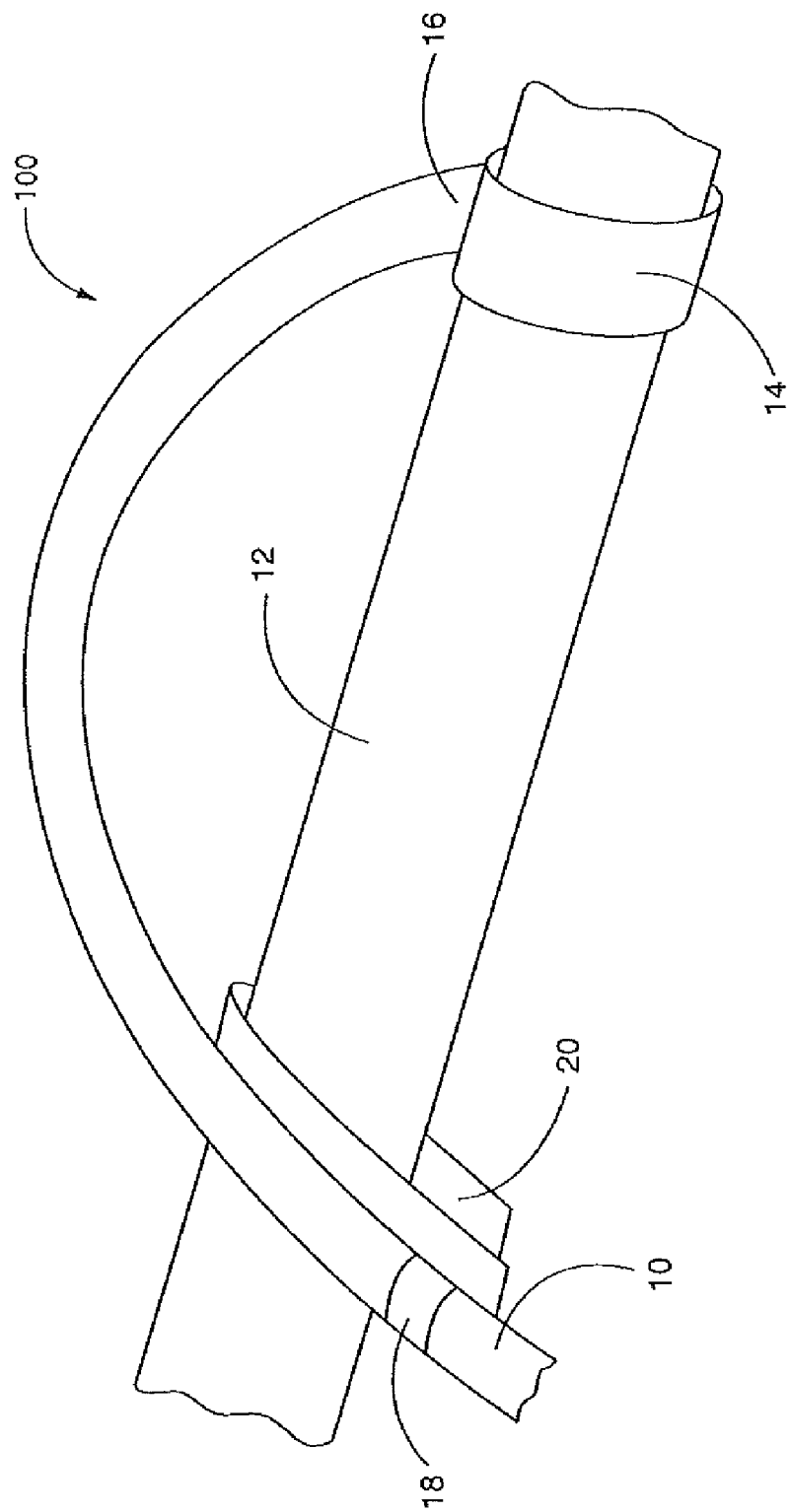
FIG. 3 is a perspective view of the structure for anchoring the main tube to the drain tube in accordance with the invention.

Reference is made to FIGS. 2 and 3 in which one embodiment of the system, generally indicated as 100 is shown. System 100 includes a drain tube 10 which extends from a tree and conveys sap from a tree. A main tube 12 is in fluid communication with one or more drain tubes 10 for conveying sap from drain tube 10 to a central collection facility.

As shown in FIG. 3, and as known in the art, a collar 14 is disposed about main tube 12. Collar 14 connects with tube 10 utilizing a spout 16 which places drain tube 10 in fluid communication with main tube 12.

In a preferred exemplary, but nonlimiting embodiment, tube 10 may be formed of two sections joined by connector 18. A strap 20 is disposed about main tube 12 and is connected to drain tube 10 so that main tube 12 is supported at least in part by drain tubes 10. In a preferred, but nonlimiting embodiment, strap 20 is connected to connector 18. It should be understood that connector 18 may simply be a collar on a unitary drain tube having a hook, or other structure for engaging and holding strap 20 about main tube 12. Strap 20 may be substituted by any structure which couples drain tube 10 to main tube 12. In this way, main tube 12 is supported in part by drain tube 10 at collar 14 and/or strap 20. Additionally, strap 20 aids in maintaining drain tube 10 in place during use.

In a preferred, but nonlimiting exemplary embodiment, drain tube 10 is a hollow tube formed of plastic having an inner diameter of about 5/16 of an inch in an exemplary, but nonlimiting example. Main tube 12 has a substantially greater inner diameter than drain tube 10, and in a preferred nonlimiting embodiment, has a diameter of about one inch.

Figure 4:
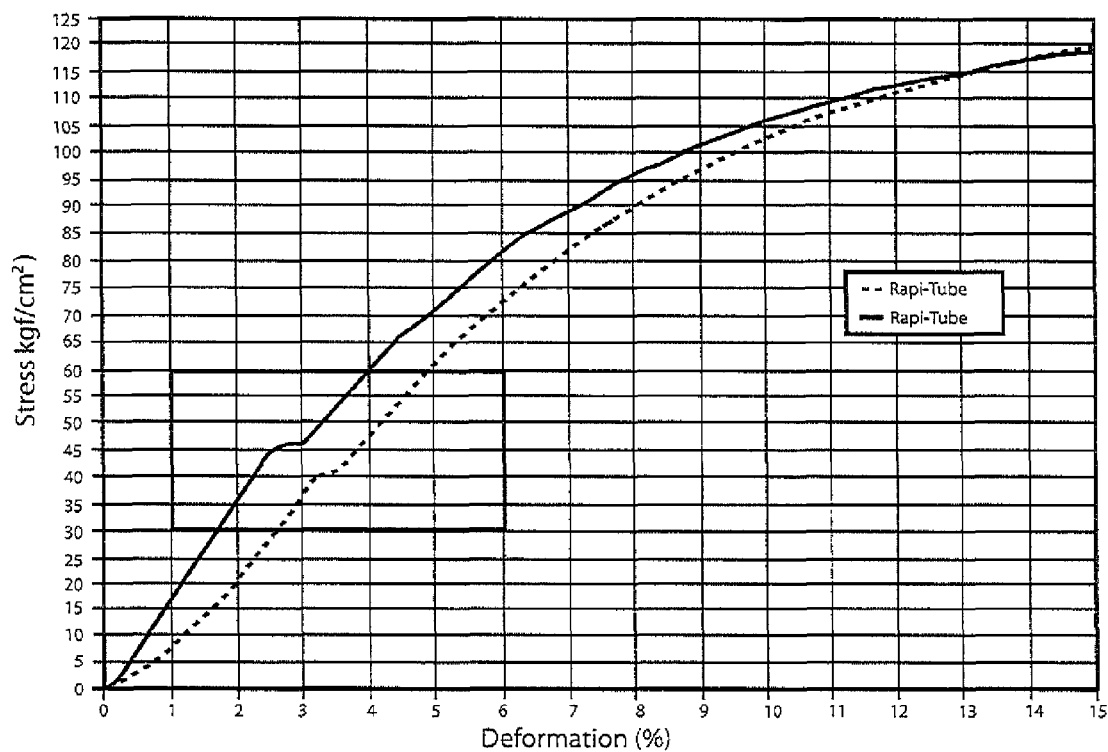
FIG. 4 is a deformation graph comparing the deformation of tubes constructed in accordance with the system of the instant invention.

As shown in FIG. 4, main tube 12 (each line representing an exemplary tube constructed in accordance with the invention) exhibits elasticity represented as a percentage deformation of the material under about 30 to 60 kilograms of force per square centimeter of between about 1% and 6%. In one preferred embodiment, the percentage deformation under 35 to 55 kilograms of force per square centimeter is between 1% and 5%. In a more preferred, nonlimiting embodiment, the percentage deformation under 40 to 50 kilograms of force per square centimeter is in the range of 2% and 4%. In a most preferred, but nonlimiting embodiment, the percentage deformation under 40 to 50 kilograms of force per square centimeter is between 3.0% and 3.5%.

Tube 12 may be made from any of a polyolefin, polyethylene, elastomer PVC, PVC, polyurethane elastomer or polyolefin elastomer. However, in a preferred but nonlimiting embodiment, tube 12 is a plastic tube made of a polyolefin elastomer (ethylene-octene copolymer), a high density polyethylene (substantially 0.961 g/cc or greater), and additives such as an ultraviolet protector and a color. In a preferred nonlimiting embodiment, the polyolefin elastomer is present in a range between 40% to 80% by weight of the formula. In a more preferred nonlimiting embodiment, the polyolefin elastomer is present in a ratio of 50% to 70% by weight. In an even more preferred nonlimiting embodiment, the polyolefin elastomer is present within a range of 55% to 65% by weight. In the most preferred nonlimiting embodiment, the percentage by weight of polyolefin elastomer is one of 56, 57, 58, 59, 60, 61, 62, 63 or 64%. Main tube 12 may be formed by an extrusion process known in the art.

The UV protector may be present at about 4% by weight in a nonlimiting example. A color additive is present at about 0 to 1% by weight. It should be noted that the presence of color is mere design choice and the use of UV protector is optional, but due to the outdoor nature of the intended use of the system, provides longevity for the main tube.

As a result of constructing a main tube 12 in accordance with the invention, the likelihood of plastic deformation is significantly reduced so that there is no need for supporting main tube 12 along its length to prevent plastic deformation from movement experienced during normal use. The prior art spinal support wire and necessary anchor wire and all of its shortcomings may be removed. This results in a savings of man hours in assembling and disassembling system 100, a savings in material as there is no longer a need for the spinal wire or an anchoring wire, and a reduction in the need to replace tubing 12 as it reduces the occurrence of plastic deformation reducing the maintenance required for system 100.

Figure 5:
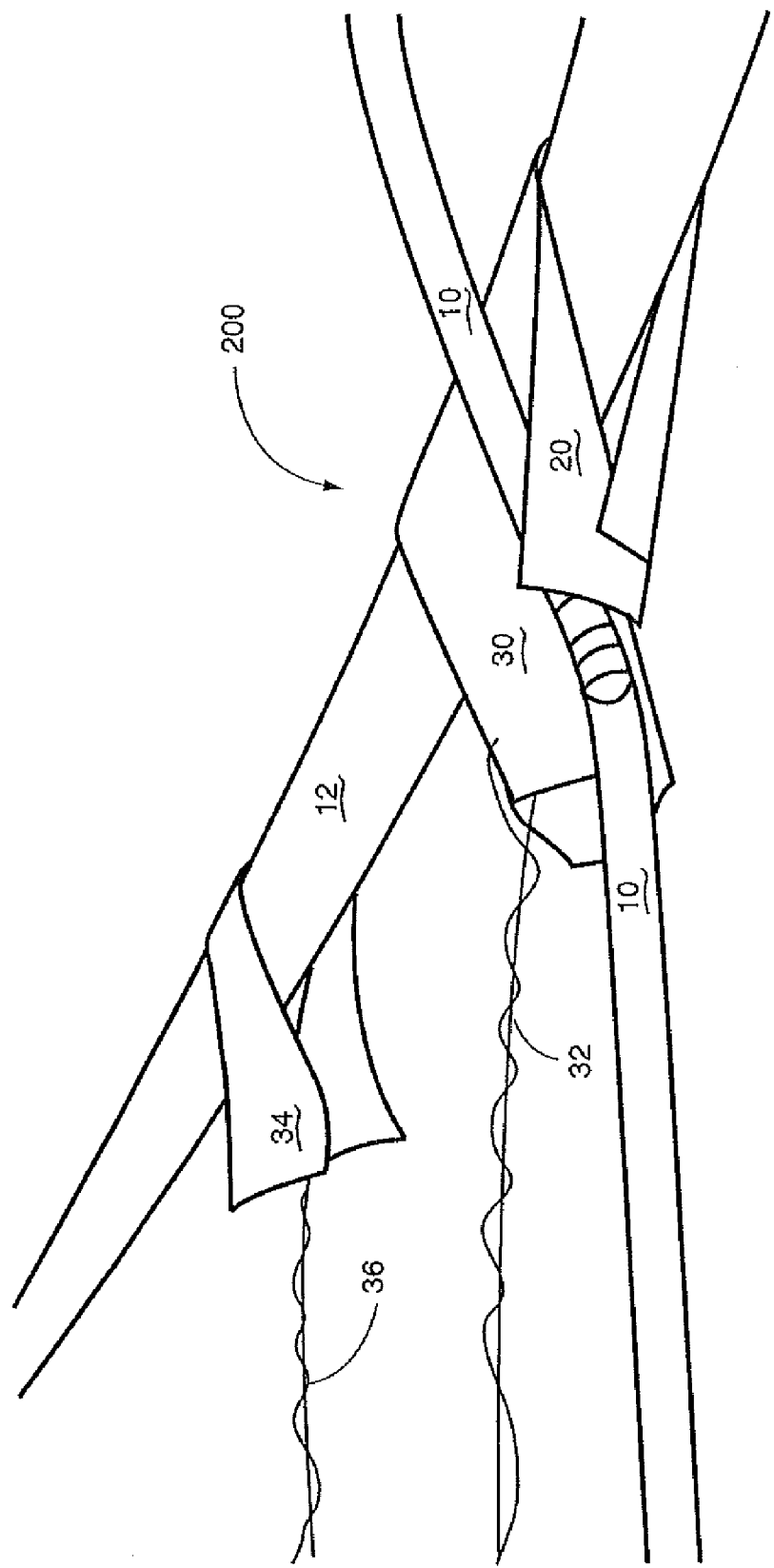
FIG. 5 is a prospective view of the structure for anchoring the main tube to the drain tube in accordance with another embodiment of the invention.

Reference is made to FIG. 5 in which a preferred embodiment of the invention, generally indicated as 200 is provided. Like numerals are utilized to indicate like structure, in this embodiment a further supplemental strap is shown to support the main tube at nondraining positions.

As discussed above in connection with FIG. 3, a strap 20 is provided and looped around main tube 12 and affixed to a second portion of drain tube 10 to provide further support and a distribution of weight of main tube 12 along each drain tube 10. Strap 20 may be affixed, in an exemplary embodiment, to a collar 18 disposed about drain tube 10. In this way, sap flows through drain tube 10 to main tube 12 to a central collecting point (not shown).

In system 200 (see FIG. 5), support may also be provided by additional straps 30, 34 disposed along the length of main tube 12. These additional straps may be anchored to one or more trees.

Again, system 200 includes a drain tube 10 which extends from a tree (not shown) to convey sap from the tree. Main tube 12 is in fluid communication (not shown) with one or more drain tubes 10 for conveying sap from a drain tube 10 to a central collection facility. As is known in the art, the central collection facility, may be a negative pressure pump, a gravity collector or the like. A strap 20 is disposed about main tube 12 and is connected to drain tube 10.

In system 200, one or more additional straps 30, 34 are disposed about main tube 12 for additional support during use. These additional straps 30, 34 are connected between main tube 12 and a tree by wire supports 32, 36. In this way, main tube 12 is supported so as not to fall to the ground, but is permitted to move or shift along its length as needed because of the absence of the spinal support provided by the prior art spinal wire or spinal back.

Figure 6:
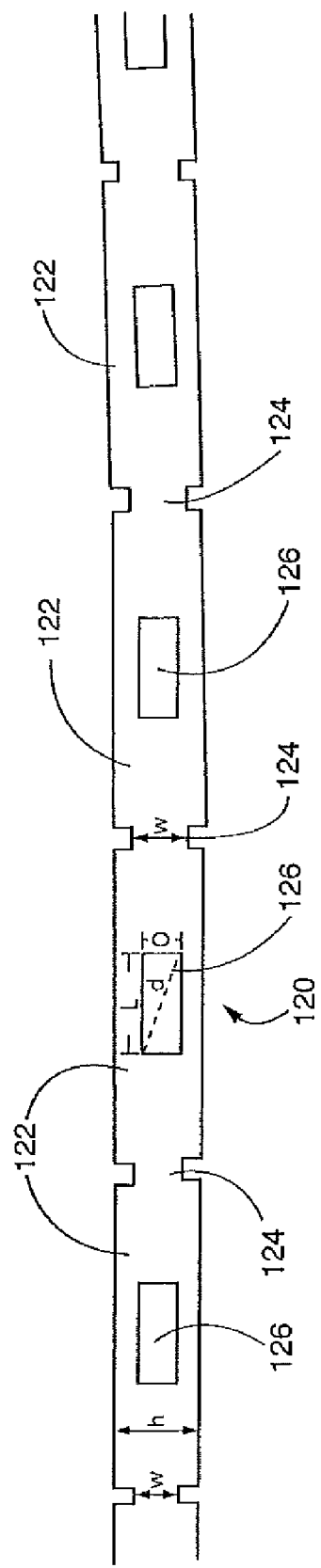
FIG. 6 is a plan view of a strap constructed and used in accordance with the invention.
Figure 7:
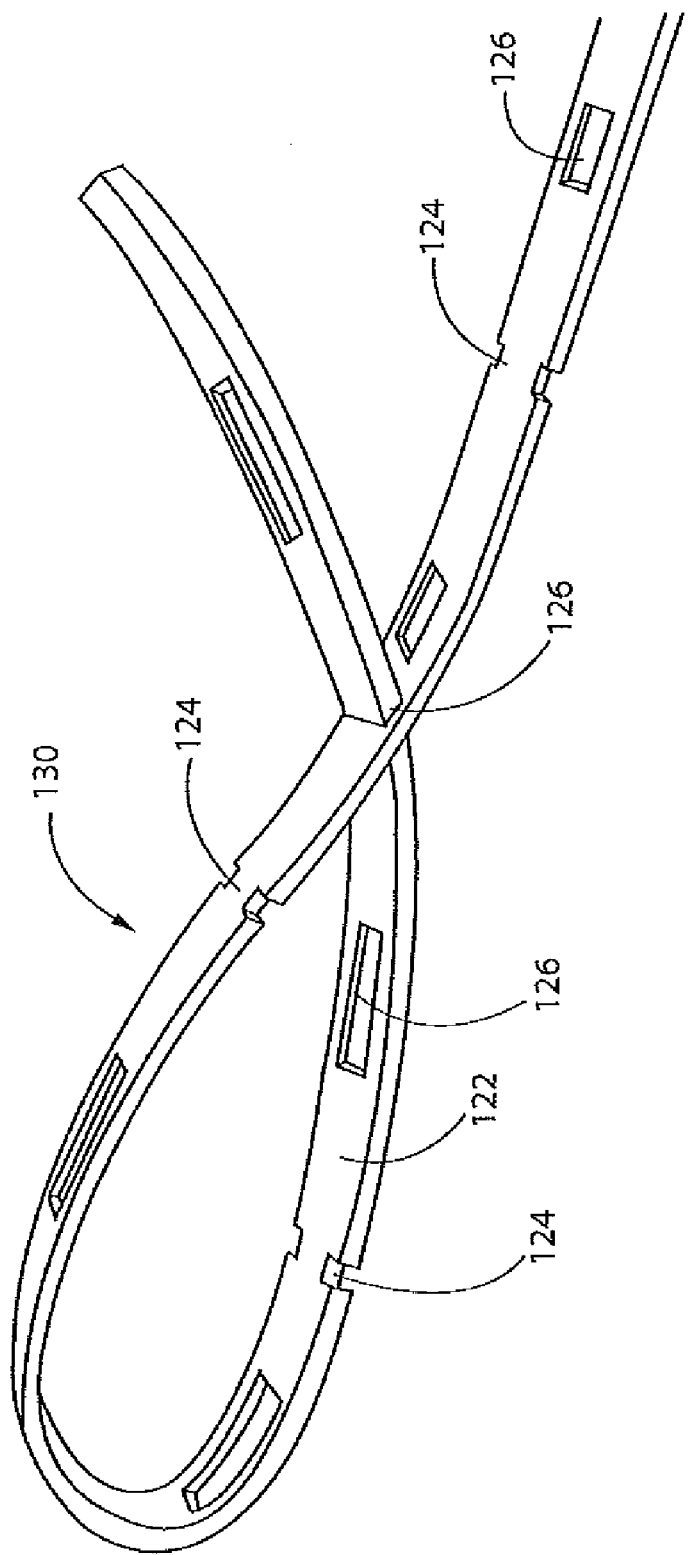
FIG. 7 is a perspective view of the strap looped upon itself in accordance with the invention.

Reference is now made to FIGS. 6 and 7 in which a strap, generally indicated as 120, constructed in accordance with another embodiment of the invention is provided. Strap 120 is formed as a unitary strip having a plurality of body portions 122 separated by a respective waist portion 124 disposed between adjacent body portions 122.

Each body portion 122 has a height h. Each waist portion has a height w. Each body portion is formed with a hole 126 therein. Hole 126 has a length L, a height o and a diagonal d. The length of diagonal d of opening 126 is greater than the height h of body 122 while the height L may be greater than height h, but is not necessary. Opening 126 has a height o which is less than height h of body 122, but greater than the height w of waist 124.

The area receiving the force on the strap 120 is relatively small compared to the area of main tube 12 receiving the force. Strap 120 has a material strength (rigidity) greater than the strength of main tube 12 but the force result is lower than the force experienced by the main tube, i.e. the strap stretches more than the main tube. In this way, if the tree or something were to fall over the pipe line, the strap 120 will break before main tube 12. However, strap 120 must be of sufficient strength and rigidity to maintain main tube 12 relatively straight.

In a preferred, but exemplary nonlimiting embodiment, strap 120 must be capable of resisting a tension of greater than about 250 Newtons. The critical area size of the strap should be such that the F/CA=strength at yield, where F=force and CA=the critical area undergoing the stress. In a preferred embodiment, the yield strength is at least about 6.5 Mpa. The strength at yield may be affected by either adjusting the size of the critical area, by using materials with high strength and high flexibilities or both. The strap may be made from polyethylene, elastomer PVC, polyurethane elastomer, polyethylene elastomer. However, in a preferred, but nonlimiting embodiment, a blend of low density material polyethylene elastomer (less than about 0.926 g/cc) and high density polyethylenes are utilized to make strap 120.

As seen in FIGS. 7 and 9 (like numerals are utilized for like structures for ease of description) when in use, strap 120 would be looped around main tube 12. A lead end of strap 120 would be passed through an opening 126 at a substantially forty five degree angle relative to itself. Once a desired number of bodies 122 has passed through, the strap 120 is untwisted so that waist 124 is disposed within opening 126 at a substantially right angle to body portion 122. In this way, body 122 catches opening 126 to maintain strap 120 looped upon itself.

It is readily understood by those skilled in the art, that the distance from a tree by which main tube 12 is supported, and/or the size of the loop 130 formed by strap 120 may be adjusted by passing a desired number of bodies 122 through a selected opening 126. Any excess portion of strap 120 extending through opening 126 may then be trimmed. This structure replaces the needs for a strap 20, 30, 34 and the associated wires 32, 36; simplifying construction and structure.

As seen from FIG. 2, during use, a respective drain tube 10 is affixed to a respective tree so that a plurality of drain tubes 10 are suspended from and extend from a plurality of trees (the trees do not make up a part of the invention). A collar 14 is placed in fluid communication with drain tube 10 through spout 16. A main tube 12 is disposed within a collar 14 which is in fluid communication with spout 16, and in turn, drain tube 10. In this way, main tube 12 traverses a path between a plurality of trees and is suspended at least in part along the path by the two or more drain tubes 10.

Thus while there have been shown, described, and pointed out novel features of the present invention as applied to preferred embodiments thereof, it will be understood that various omissions and substitutions and change in the form and detail are contemplated and may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which is a matter of the language, might be said to fall there between.

What is claimed as new and desired to be protected by Letters Patent of the United States is:

1. A system for collecting sap from a tree comprising:
   a main tube supported at least in part by at least two or more supports, without the use of a spinal support, at least one of the two or more supports extending from a tree to the main tube so the main tube can negotiate a path above the ground between a plurality of trees from which the two or more supports are suspended.

2. The system of claim 1, wherein the main tube has a percentage deformation at 30 to 60 kilograms per square centimeter of force of between about 1% and 6%; the main tube being in fluid communication with each said respective drain tube.

3. The system of claim 1, wherein the main tube is formed from at least one of a polyolefin, polyethylene, elastomer PVC, PVC or polyurethane elastomer.

4. The system of claim 1, wherein at least one of the two or more supports is disposed about said main tube along a length of the main tube, the support being capable of being suspended from, and supported by, a respective tree.

5. The system of claim 1, wherein at least one of the two or more supports is a drain tube, and a second of the two or more supports extends from the drain tube and being disposed about said main tube along the length of said main tube.

6. The system of claim 1, wherein at least one of the two or more supports is a strap.

7. The system of claim 6, wherein the strap exhibits a first strength at yield, the main tube exhibits a second strength at yield, the first strength at yield being greater than the second strength at yield.

8. The system of claim 6, wherein the strap includes a first body portion and at least a second body portion, each body portion being separated by a respective waist portion disposed between adjacent body portions;
   each body portion formed with a hole therein, each body portion having a height, each hole having a diagonal, each diagonal being greater than the height of each body portion, a height of the hole being less than the height of the body portion and greater than a height of the waist, and each body portion and waist portion having a yield strength of at least about 6.5 Mpa.

9. A method for draining sap from two or more trees, comprising the steps of:
   affixing two or more supports to a respective one of said two or more trees;
   affixing a main tube to each of said respective two or more supports;
   and supporting said main tube at least in part by each respective two or more supports as the main tube traverses a path above the ground, between trees without the use of a spinal wire; said main tube having a percent deformation at about 30 to 60 kilograms of force by square centimeter of between 1% and 6%.

10. The method of claim 9, further comprising the step of forming the main tube from at least one of a polyolefin, polyethylene, elastomer PVC, PVC and polyurethane elastomer.

11. A method for draining sap from two or more trees, comprising the steps of:
    affixing a respective drain tube to a respective one of said two or more trees;
    affixing the main tube to each one of said respective drain tubes forming a main tube from at least one of a polyolefin, polyethylene, elastomer PVC, PVC and polyurethane elastomer;
    and supporting said main tube at least in part by said each respective drain tube as the main tube traverses a path between trees without the use of a spinal wire; said main tube having a percent deformation at about 30 to 60 kilograms of force by square centimeter of between 1% and 6%; and
    providing a supplemental support by affixing a support disposed about said main tube to at least one of said two or more trees.

12. The method of claim 11, wherein said supplemental support is a strap comprising a first body portion and at least a second body portion, each body portion being separated by a respective waist portion disposed between adjacent body portions;
    each body portion formed with a hole therein, the waist portion having a height, each hole having a diagonal, each diagonal being greater than the height of the waist portion, the height of each hole being less than the height of each body portion and greater than a height of each waist, and each body portion and each waist portion having a yield strength of at least about 6.5 Mpa.

13. The system of claim 11, wherein the strap exhibits a first strength at yield, the main tube exhibits a second strength at yield, the first strength at yield being greater than the second strength at yield.

* * * * *